United States Patent
Schnabel et al.

(10) Patent No.: US 8,590,508 B2
(45) Date of Patent: Nov. 26, 2013

(54) METHOD AND INJECTION MOULD FOR THE PRODUCTION OF AN INTAKE SYSTEM COMPOSED OF PLASTIC FOR INTERNAL COMBUSTION ENGINES AND INTAKE SYSTEM PRODUCED

(75) Inventors: Werner Schnabel, Regensburg (DE); Siegfried Deiss, Mötzing (DE)

(73) Assignee: Mahle International GmbH (DE)

( * ) Notice: Subject to any disclaimer, the term of this patent is extended or adjusted under 35 U.S.C. 154(b) by 975 days.

(21) Appl. No.: 12/441,047

(22) PCT Filed: Sep. 10, 2007

(86) PCT No.: PCT/EP2007/059454
§ 371 (c)(1),
(2), (4) Date: Jan. 25, 2010

(87) PCT Pub. No.: WO2008/031786
PCT Pub. Date: Mar. 20, 2008

(65) Prior Publication Data
US 2010/0126462 A1    May 27, 2010

(30) Foreign Application Priority Data
Sep. 13, 2006  (DE) .......................... 10 2006 042 942

(51) Int. Cl.
*F02D 9/10*    (2006.01)
*B29C 45/33*   (2006.01)

(52) U.S. Cl.
USPC .......................... 123/336; 123/337; 264/328.1

(58) Field of Classification Search
USPC ......... 123/337, 336, 403; 264/328.1; 425/441
See application file for complete search history.

(56) References Cited

U.S. PATENT DOCUMENTS 3,661,186 A * 5/1972 Nordgren ....................... 140/107
4,155,791 A * 5/1979 Higuchi ......................... 156/161

(Continued)

FOREIGN PATENT DOCUMENTS

| DE | 10142452   | 3/2003  |
| GB | 2393218    | 3/2004  |
| JP | 2002310019 | 10/2002 |

OTHER PUBLICATIONS

Patent abstract for JP-2002310019.

*Primary Examiner* — Stephen K Cronin
*Assistant Examiner* — Arnold Castro
(74) *Attorney, Agent, or Firm* — Rader, Fishman & Grauer PLLC

(57) ABSTRACT

The invention relates to a method which uses an injection mold for the production of an intake system which is composed of plastic and is intended for internal combustion engines, and which has a plurality of parallel-running intake pipes and which has, arranged in the intake pipes, throttle flaps operated by way of a shared shaft bearing against bearings located in the walls of the intake pipe. A simplified production process is obtained if two mandrels (1, 2) of the injection mold, intended for formation of apertures for the bearings, are inserted respectively from one side of the injection mold in such a way that ends of the mandrels (1, 2) bear against one another in the injection mold, and if the method of production of apertures situated further outwards, with respectively greater diameter than the adjacent inwardly situated apertures is such that each mandrel (1, 2) is of staged shape, and the mandrels (1, 2) are drawn out during demolding at the two sides of the injection mold.

10 Claims, 1 Drawing Sheet

(56) References Cited

U.S. PATENT DOCUMENTS

| | | | |
|---|---|---|---|
| 5,715,782 A | 2/1998 | Elder | |
| 7,219,652 B2 * | 5/2007 | Ino et al. | 123/337 |
| 7,225,792 B2 * | 6/2007 | Nakamura et al. | 123/337 |
| 2004/0163703 A1 | 8/2004 | Werder | |
| 2005/0016487 A1 * | 1/2005 | Ikuma et al. | 123/184.42 |
| 2006/0137650 A1 * | 6/2006 | Nakamura et al. | 123/337 |
| 2006/0138697 A1 * | 6/2006 | Lorenz et al. | 264/242 |

* cited by examiner

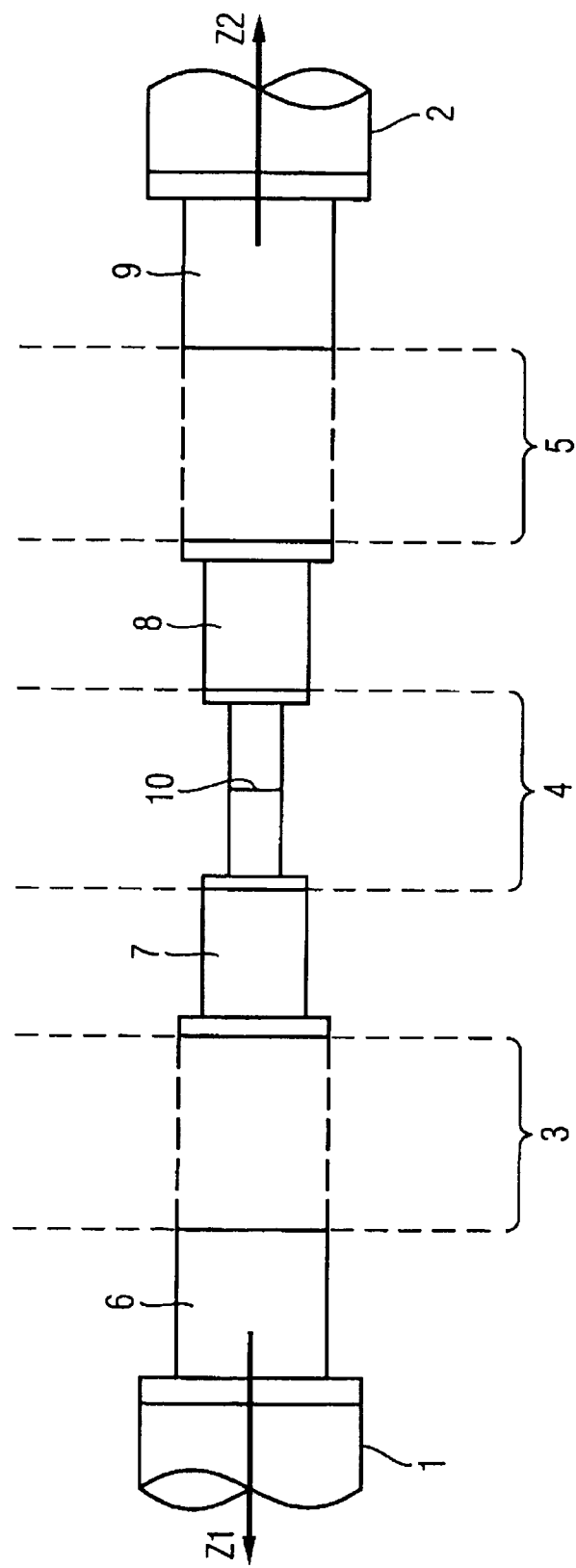

METHOD AND INJECTION MOULD FOR THE PRODUCTION OF AN INTAKE SYSTEM COMPOSED OF PLASTIC FOR INTERNAL COMBUSTION ENGINES AND INTAKE SYSTEM PRODUCED

CROSS-REFERENCES TO RELATED APPLICATION

This application is a National Stage application which claims the benefit of International Application No. PCT/EP2007/059454 filed Sep. 10, 2007, which claims priority based on German Patent Application No. DE 102006042942.7, filed Sep. 13, 2006, both of which are hereby incorporated by reference in their entirety.

The present invention relates to a method for the production of an intake system which is made of plastic and is intended for internal combustion engines, having, for example, a plurality of parallel running intake pipes, and which has, arranged in the intake pipes, throttle flaps actuated by means of a common shaft supported in bearings located in the intake pipe walls, wherein an injection molding tool is used.

The invention relates further to an intake system which can be produced by means of this method as well as to an injection molding tool suitable for carrying out the method.

When an intake system is to be produced as one piece, the difficulty occurs that the tool part, i.e. the slider or mandrel, respectively, for forming, within the intake pipes, the apertures in which later the bearing bushes are inserted, is very long. This results in difficulties during the demolding.

These difficulties can be avoided by using conically formed mandrels. However, this means that the two apertures of an intake pipe have a different diameter and that their walls are bevelled. This fact interferes with the assembly of bearing bushes for the common shaft.

From DE 101 42 452 A1, a production method is known for a throttle flap connection piece housing with a single throttle flap arranged therein. For this, on both sides of an injection molding tool, mandrels are arranged which have stepped outer diameters and which support each other axially for the injection molding process. The two larger steps located outside generate bearing apertures for receiving the bearings. The smaller steps located inside generate a passage within the throttle flap for receiving a shaft which, in turn, can be supported within the bearings.

It is the object of the present invention to propose a method for the production of an intake system made of plastic in which, for removing the slider, no high forces have to be applied so that during the demolding, no difficulties occur.

This object is solved in the method of the type mentioned above in that the injection molding tool has two mandrels for forming the apertures for the bearings so that each mandrel can be inserted or withdrawn from one side of the injection molding tool, that the ends of the mandrels mutually support one another within the injection molding tool, and that each mandrel is formed in a stepped shape in such a manner that for each of the bearing positions located further outwards, larger diameters are provided, respectively, than for the adjacent inwardly located bearing positions.

In the method according to the invention, the core pulling is carried out from two sides so that no excessively high forces are necessary. The mandrels are stepped to make them thicker, which increases the stiffness, and whereby the demolding draught can be accomplished easier.

Further advantageous developments of the method according to the invention, and of the intake system produced according to the method according to the invention, and of the injection molding tool usable for carrying out the method, respectively, are apparent from the sub-claims as well as from the following description of an exemplary embodiment of two mandrels according to the invention by means of the attached FIGURE.

The FIGURE is a schematic illustration of two mandrels according to the present invention, wherein only the details necessary for the understanding of the invention are shown.

The mandrels 1 and 2 which mutually support one another axially in the plane 10 inside of an injection molding tool, which, by the way, is not shown, serve for generating the apertures within the intake pipes.

The two pulling directions for the demolding are indicated with Z1 and Z2.

The dotted lines denoted with 3, 4, and 5 show the position of intake pipes in which apertures corresponding to the bearing bushes have to be kept free. In the present case, three intake pipes run in parallel, however, it is understood that more than three intake pipes can also belong to an intake system.

Indicated with 6, 7, 8, and 9 are the steps or sections, respectively, of the mandrels, which contribute to the formation of the corresponding apertures within the intake pipes.

It is apparent from the FIGURE that for the two outer intake pipes to the left and to the right, bigger diameters are chosen for the apertures than for the intake pipe in the middle.

By means of this stepped shape, the advantage arises that the mandrels 1, 2 can be easily demolded, hence can be easier pulled out during demolding. In addition, with the right selection of the diameters of the apertures, the intake system produced this way provides the possibility that the inwardly located bearing bushes for the inwardly located intake pipe can be inserted from the side through the outwardly located apertures of the outwardly located intake pipes to position them within the inwardly located apertures of the inner intake pipe.

In the bearing positions, i.e., in the apertures within the side walls of the intake pipes, the actual bearing bushes are inserted, wherein preferably all bearing bushes have the same inner diameter. The bearing material differs from the material of the intake pipe and consists of a plastic material which facilitates the sliding of a shaft. This not-shown shaft is rotatably supported within the bearing bushes. On this shaft, throttle flaps which are allocated to the individual intake pipes are mounted torque-proofed so that by rotating the shaft, all throttle flaps can be actuated at the same time. Each intake pipe includes here a separate throttle flap.

For fastening the bearing bushes, there are a plurality of possibilities. In one of those, the bearing bushes are snapped into the respective intake pipe, which requires an aperture within the intake pipe in direction of the cylinder head flange and which results in slight leakages between the intake pipes since the bearing bushes have to sit slightly floating within the aperture to compensate the distortion of the intake pipe. The bushes have a stop or a step, respectively, which forms a certain sealing.

Another possibility of fastening exists in that the bearing bushes are placed into the respective intake pipe by means of friction welding. Here, the bearing bushes are centred by means of a tool which corresponds to the later shaft. Thereby, the bearing positions are aligned even with a distorted intake pipe and, thereby, the flap shaft is smooth-running. A further advantage is the tightness between the intake pipes since at the shaft only a minor leakage exists which is very small and predictable.

The bearing bushes are welded into the intake pipes by means of friction or ultrasonic welding. In the case of ultrasonic welding, small beads are placed onto the flange of the bearing bushes. For the friction welding, rounded embossments on the outer diameter of the bearing bushes are more advantageous. The flange at the bearing bushes serves as a stop for positioning the bearing bushes and as a carrier of a holding device so that the bearing bushes can be welded in.

Hereinafter, the advantages of the method according to the invention are illustrated again.

The two mandrels are short and are moved from two sides. In doing so, the mandrels are mutually centering one another or are centred within the core of an intake pipe. Thereby, only small forces occur during demolding. The mandrels are stepped to be able to make them thicker, which results in a higher stiffness and whereby the demolding draught can be accomplished easier. By means of the stepping, in addition, a flange can be arranged on the bearing bushes, which is advantageous for the sealing and positioning.

The bearings consist of a material which is to be welded to the intake pipe (e.g. BA6 GF30) and which, at the same time, also provides good sliding characteristics for the flap shaft (e.g. PA6 unreinforced with a PTFE portion). The bearings have features for the welding into the intake pipe, for example, wedge-shaped embossments at the flange for welding by means of ultrasonic or friction welding, or cone-like embossments on the outer diameter for welding-in by means of friction welding.

The bearings have an engagement feature at the flange for the friction tool. That can be indentations or embossments.

The invention claimed is:

1. An injection molding tool for the production of an intake system which is constructed of a plastic based material and is for an internal combustion engine, the injection molding tool for forming apertures for the intake system comprising:
   two mandrels each including ends, wherein each mandrel is inserted and pulled out respectively from a side of the injection molding tool wherein the ends of the mandrels mutually support one another within the injection molding tool,
   wherein each mandrel is formed step-shaped,
   wherein for the apertures formed outwardly towards the ends of the mandrels, the respective mandrel is provided with a bigger diameter than for the apertures that are formed inwardly away from the ends of the mandrels, and
   wherein the tool is configured to form a plurality of intake pipes with the apertures located between adjacent side walls such that bearings may be located within the intake walls and received by the apertures and wherein a shaft may in turn be supported in the bearings, the diameters represented by each step of a mandrel being further configured to allow for the receipt of throttle flaps arranged in the intake pipes and to be mounted about the shaft, the intake pipes to be positioned in parallel and including the ends, apertures of different diameter to be created by each step of a respective mandrel, the apertures that are located further outwardly towards the ends of the intake pipes to each have a bigger diameter than the adjacent apertures located inwardly away from the ends of the intake pipes.

2. The injection molding tool according to claim 1, wherein the diameter is selected such that inwardly located bearing bushes are inserted respectively through the apertures that are located further outwardly towards the ends of the mandrels.

3. A method for the production of an intake system which is constructed of a plastic based material and is for an internal combustion engine, which has a plurality of parallel running intake pipes, and which has, arranged in the intake pipes, throttle flaps actuated by means of a common shaft supported in bearings located in the intake pipe walls, wherein an injection molding tool is used, comprising the steps of:
   providing two mandrels of the injection molding tool for forming of apertures for the bearings within a plurality of parallel running intake pipes, the mandrels including ends;
   inserting the mandrels respectively from a side of the injection molding tool such that the ends of the mandrels mutually support one another within the injection molding tool;
   producing the mandrels such that the apertures located further outwardly towards the ends of the mandrels each are with a bigger diameter than the apertures that are located adjacent inwardly away from the ends of the mandrels, where each mandrel is formed step-shaped; and
   pulling out the mandrels during demolding on both sides of the injection molding tool and
   providing throttle flaps arranged in the intake pipes;
   fastening bearings within the intake walls and received by the apertures; and
   supporting a shaft in the bearings for the actuation of the throttle flaps.

4. The method according to claim 3, further comprising the step of selecting the diameters for the apertures such that inwardly located bearing bushes are inserted respectively through the apertures that are located further outwardly.

5. An intake system including intake walls and constructed from a plastic based material for internal combustion engines, comprising:
   a plurality of intake pipes with apertures, the intake pipes positioned in parallel and including ends;
   throttle flaps that are located within the intake pipes;
   a common shaft, in which the throttle flaps are actuated by the common shaft;
   bearings located within the intake walls and received by the apertures, wherein the shaft is supported in the bearings and the apertures that are located further outwardly towards the ends of the intake pipes each have a bigger diameter than the adjacent apertures located inwardly away from the ends of the intake pipes.

6. The intake system according to claim 5, wherein the diameters for the apertures are selected such that inwardly located bearing bushes are inserted respectively through the apertures that are located further outwardly.

7. The intake system according to claim 6, wherein a material of the bearing bushes is a different material than the material of the intake pipe and includes a plastic material which promotes sliding of the common shaft.

8. The intake system according to claim 6, wherein the bearing bushes each have about the same inner diameter.

9. The intake system according to claim 8, wherein a material of the bearing bushes is a different material than the material of the intake pipe and includes a plastic material which promotes sliding of the common shaft.

10. The intake system according to claim 5, including bearing bushes, wherein a material of the bearing bushes is a different material than the material of the intake pipes and includes a plastic material which promotes sliding of the common shaft.

* * * * *